US008498331B2

(12) United States Patent
Kato et al.

(10) Patent No.: US 8,498,331 B2
(45) Date of Patent: Jul. 30, 2013

(54) MOTION PICTURE RECEIVING DEVICE, MOTION PICTURE TRANSMITTING DEVICE, MOTION PICTURE DECODING METHOD, AND MOTION PICTURE ENCODING METHOD

(75) Inventors: Sadaatsu Kato, Yokosuka (JP); Choong Seng Boon, Yokohama (JP); Tsutomu Horikoshi, Kamakura (JP); Takashi Suzuki, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 2856 days.

(21) Appl. No.: 10/882,838

(22) Filed: Jul. 1, 2004

(65) Prior Publication Data
US 2005/0025234 A1 Feb. 3, 2005

(30) Foreign Application Priority Data

Jul. 1, 2003 (JP) ................................. 2003-189635
Jun. 2, 2004 (JP) ................................. 2004-165049
Jun. 29, 2004 (JP) ................................. 2004-192067

(51) Int. Cl.
*H04N 7/12* (2006.01)
*H04N 7/50* (2006.01)

(52) U.S. Cl.
CPC ....................................... *H04N 7/50* (2013.01)
USPC .................................................. 375/240.01

(58) Field of Classification Search
USPC ....................................... 375/240.01; 455/500
See application file for complete search history.

(56) References Cited

U.S. PATENT DOCUMENTS 5,014,267 A 5/1991 Tompkins et al. ............... 370/62

| | | | |
|---|---|---|---|
| 5,790,179 A | 8/1998 | Shibata et al. | 370/94.1 |
| 6,675,008 B1* | 1/2004 | Paik et al. | 455/415 |
| 6,798,915 B2 | 9/2004 | Suh et al. | |
| 7,242,942 B2* | 7/2007 | Kunihiro | 455/444 |
| 2002/0023165 A1* | 2/2002 | Lahr | 709/231 |
| 2002/0102978 A1* | 8/2002 | Yahagi | 455/437 |
| 2003/0095561 A1* | 5/2003 | Hwang | 370/432 |
| 2004/0030930 A1* | 2/2004 | Nomura | 713/201 |

(Continued)

FOREIGN PATENT DOCUMENTS

CN 1329438 1/2002
EP 0 669 765 A2 8/1995

(Continued)

OTHER PUBLICATIONS

Chinese Office Action dated Mar. 31, 2006.

(Continued)

*Primary Examiner* — Jay Patel
*Assistant Examiner* — Jessica Prince
(74) *Attorney, Agent, or Firm* — Brinks Hofer Gilson & Lione

(57) ABSTRACT

The present invention provides a motion picture receiving device, comprising: image data receiving means for receiving encoded image data; decoding means for decoding the image data received by the image data receiving means; output means for outputting the image data decoded by the decoding means; and control means for determining an encoding condition of image data by communicating with a motion picture transmitting device which transmits the image data, and for controlling the decoding means to enable decoding of the image data encoded in accordance with the encoding condition; wherein, when the number of motion picture transmitting devices changes, the control means determines the encoding condition on the basis of the changed number of the motion picture transmitting devices.

5 Claims, 11 Drawing Sheets

U.S. PATENT DOCUMENTS

Figure 1:
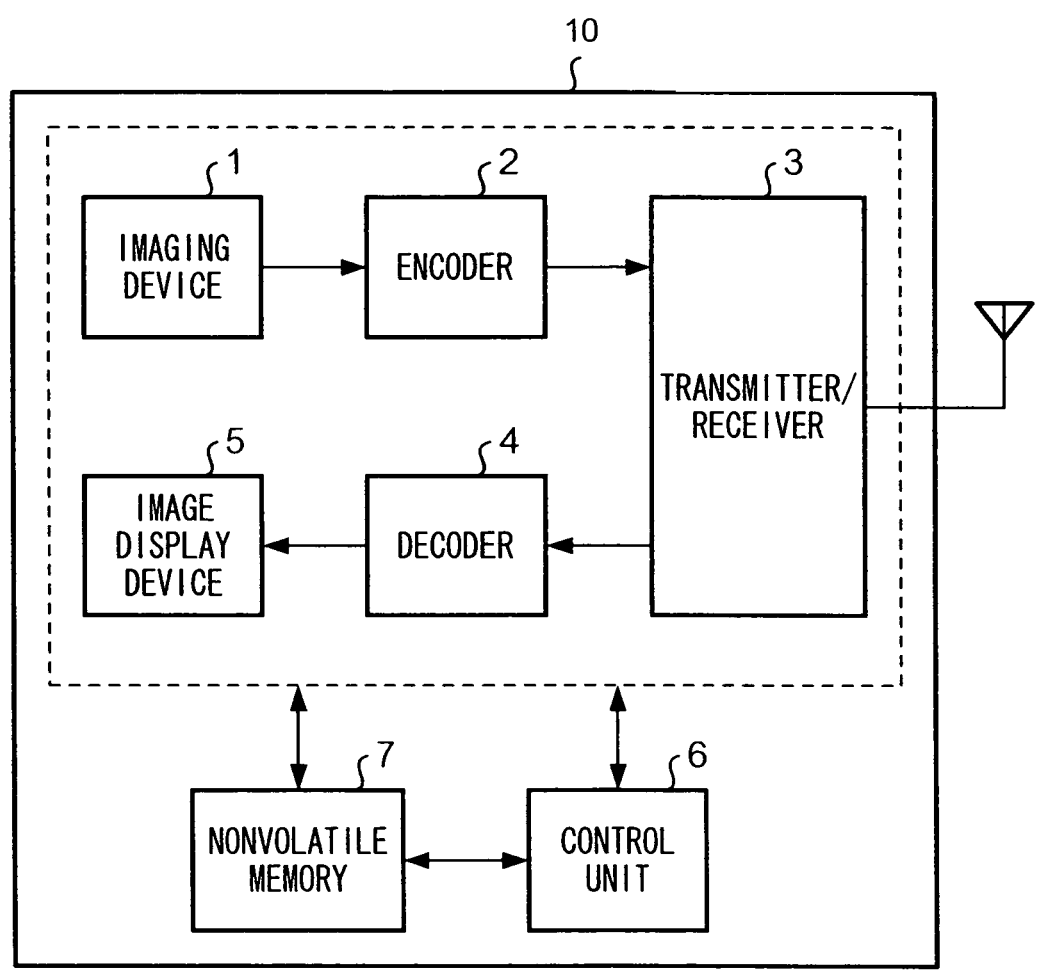

| | | | | |
|---|---|---|---|---|
| 2005/0157937 A1* | 7/2005 | Kondo et al. | ............... | 382/236 |
| 2005/0166050 A1* | 7/2005 | Kosaki | ..................... | 713/171 |
| 2006/0217074 A1* | 9/2006 | Wakabayashi | ............... | 455/68 |
| 2006/0274955 A1* | 12/2006 | Honda et al. | ............... | 382/236 |
| 2007/0110064 A1* | 5/2007 | Ohkubo et al. | ............ | 370/390 |
| 2008/0069241 A1* | 3/2008 | Kadono et al. | .......... | 375/240.23 |

FOREIGN PATENT DOCUMENTS

| | | |
|---|---|---|
| EP | 0 669 765 A3 | 11/1996 |
| JP | 63-276938 | 11/1988 |
| JP | 7-236136 A * | 2/1994 |
| JP | H 7-236136 A | 9/1995 |
| JP | 09-018846 | 1/1997 |
| JP | 2002-158983 | 5/2002 |

OTHER PUBLICATIONS

Extended European Search Report, dated Mar. 8, 2012, issued in European Patent Application No. 04015285.2, (3 pgs.); European Patent Office, Munich, Germany.

European Examination Report, dated Mar. 22, 2012, issued in European Patent Application No, 04015285.2 (9 pgs.); European Patent Office, Munich, Germany.

Japanese Office Action w/ English translation dated May 12, 2009, 6 pgs.

European Office Action—(Summons to Attend Oral Proceedings pursuant to Rule 115(1) EPC) dated May 2, 2013 (8 Pgs.).

* cited by examiner

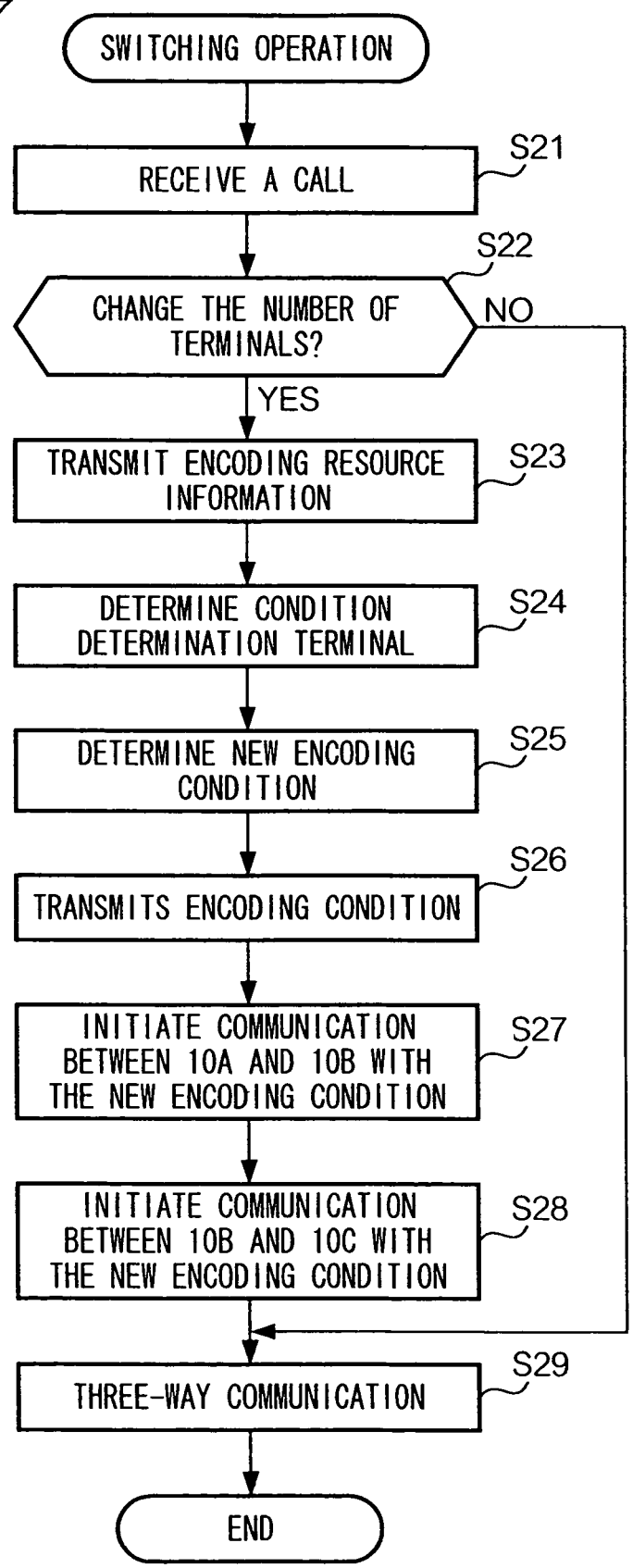

MOTION PICTURE RECEIVING DEVICE, MOTION PICTURE TRANSMITTING DEVICE, MOTION PICTURE DECODING METHOD, AND MOTION PICTURE ENCODING METHOD

This application claims priority under 35 U.S.C. §119 to Japanese Patent Application Nos. 2003-189635 filed Jul. 1, 2003; 2004-165049 filed Jun. 2, 2004; and 2004-192067 filed Jun. 29, 2004, the entire contents of which are hereby incorporated by reference.

TECHNICAL FIELD

The present invention relates to a device and a method for receiving and transmitting motion picture data.

RELATED ART

Communication terminals such as videophones or mobile phones can transmit and receive images (motion pictures). This kind of communication terminal transmits to a correspondent terminal encoded image data captured by a CCD camera while receiving encoded image data transmitted by the correspondent terminal, decodes the received image data, and displays on its screen images corresponding to the received image data. To encode image data, a majority of communication terminals use a motion picture coding algorithm such as ISO/IEC international Standard 14496-2 (hereinafter referred to as "MPEG-4 Visual") or ITU-T Recommendation H.263 (hereinafter referred to as "H.263").

These motion picture coding algorithms process a motion picture as a series of successive still pictures (frames). Motion picture coding algorithms are designed to compress data by compressing only such motion picture data as differs within two successive frames. This kind of encoding algorithm is referred to as "inter-frame differential encoding". In addition to employing "inter-frame differential coding", MPEG-4 Visual and H.263 also employ motion compensation by referring only to a frame immediately prior to a current frame. Data of a frame immediately prior to the current frame is stored in a frame memory, which is provided with an encoder or decoder for carrying out inter-frame differential encoding or motion compensation. The frame immediately prior to the current frame is called a "reference frame".

In recent years, efforts have been made to standardize another algorithm, H.264/AVC. This algorithm encodes image data by carrying out inter-frame differential encoding and motion compensation by referring to a plurality of frames prior to a frame of interest. Accordingly, H.264/AVC is able to carry out encoding with a higher degree of accuracy and at a higher compression rate than other motion picture coding algorithms, but use of this algorithm necessitates storage of a plurality of reference frames in a frame memory of the encoder or decoder.

For transmitting/receiving a motion picture between two communication terminals, each of the communication terminals must be able to determine compatible communication conditions including, for example, a motion picture encoding algorithm, a bit rate, a frame rate, a number of reference frames, a screen size of the image data, and other relevant conditions relating to the encoding and decoding.

There are communication terminals which can receive motion picture data from a plurality of correspondent terminals (refer to, for example, Japanese Patent Laid-Open Publication No. JP7-236136A). Such a communication terminal receives motion picture data transmitted from a plurality of correspondent terminals, and displays motion pictures in different windows on a display in accordance with the motion picture data received. The communication terminal changes the transmission rate of each motion picture data in response to the display state of the window by communicating to each other the information to determine compatible communication conditions. For example, the quality of the motion picture data on the foreground window or the widest window may be changed to be "high quality".

To transmit/receive motion pictures between three communication terminals, for example, in a case that a third communication terminal joins and participates in motion picture communication already taking place between a first and a second communication terminal, each participating communication terminal needs to receive two series of motion picture data, from the second and the third communication terminals, respectively, and to decode and display motion picture data received.

However, in initiating three-way communication, it is necessary for the first and second communication terminals to change encoding conditions determined at the start of their two-way communication. This gives rise to a problem in that, the first and second communication terminals are unable to simultaneously maintain communication with each other while commencing communication with the third terminal by changing encoding conditions. This problem is more pronounced in a communication terminal which has a low encoding/decoding capability, such as a mobile telephone which has a limited calculation capacity and limited memory.

For the purpose of example, it could be assumed that the decoder of the first communication terminal has an input buffer which has a maximum available writing speed of 64 kbps, which results in an encoding condition being determined such that a bit rate between the first communication terminal and the second communication terminal is set at 64 kbps. In this case, when an attempt is made to initiate three-way communication, since the first terminal needs to receive motion picture data from the third communication terminal as well as from the second communication terminal, the first communication terminal will not be able to write all of the received data into the input buffer. Therefore, the first communication terminal will not be able to decode the motion picture data accurately. Namely, the introduction of a third terminal into the communication between the first two terminals results in a set bit rate of 64 kbps, which is a maximum bit rate, being exceeded, thus preventing three-way communication.

Furthermore, in a case that a determined encoding condition is that all of the storage area of the frame memory in the decoder of the first communication terminal is reserved for storing reference frames to communicate with the second communication terminal, the first communication terminal will not be able to decode motion picture data from the third communication terminal because it has no available storage area in the frame memory for storing reference frames for communication with the third terminal. Therefore, the first communication terminal is unable to perform three-way communication.

This problem also arises in H.264/AVC, which uses a plurality of reference frames. For example, in a case that the decoder of the first communication terminal has five frame memories for storing reference frames, and an encoding condition is that all of the five frame memories are reserved for storing reference frames to communicate with the second communication terminal, the first communication terminal will not be able to decode motion picture data because the first communication terminal has no frame memory storage area available for communication with the third communication terminal.

DISCLOSURE OF THE INVENTION

The present invention provides a solution to the above problem. To solve the problem, the present invention enables a communication terminal to receive and decode motion picture data from other communication terminals, even in a case that a number of communication terminals sending motion picture data changes. Further, the present invention allows a communication terminal to encode and transmit motion picture data to other communication terminals, even in a case that a number of communication terminals receiving motion picture data changes.

To solve the problem of the prior art the present invention provides a motion picture receiving device, comprising: image data receiving means for receiving encoded image data; decoding means for decoding the image data received by the image data receiving means; output means for outputting the image data decoded by the decoding means; and control means for determining an encoding condition of image data by communicating with a motion picture transmitting device which transmits the image data, and for controlling the decoding means to enable decoding of the image data encoded in accordance with the encoding condition; wherein, when the number of motion picture transmitting devices changes, the control means determines the encoding condition on the basis of the changed number of the motion picture transmitting devices.

In one embodiment, the control means may determine the encoding condition on the basis of decoding capacity of the decoding means.

In another embodiment, the control means may determine the encoding condition of image data by communicating with one or a plurality of motion picture transmitting devices which transmit the image data, on the basis of the decoding capacity available for each of the one or a plurality of motion picture transmitting devices or the number of the motion picture transmitting devices, after the encoding condition is updated in response to an increased number of the motion picture transmitting devices.

Yet in another embodiment, the control means may control the output means to output the decoded image data.

Yet in another embodiment, the output means may be a display means for displaying a motion picture generated on the basis of the decoded image data decoded by the decoding means; and the control means may determine the encoding condition on the basis of screen size of the motion picture displayed on the output means.

Yet in another embodiment, the motion picture receiving device may further comprise resource information receiving means for receiving resource information from each of the motion picture transmitting devices, the resource information being information for determining the encoding condition at each of the motion picture transmitting devices; and storage means for storing the resource information received by the resource information receiving means; wherein the control means determines the encoding condition on the basis of the resource information stored in the storage means. In this embodiment, the motion picture receiving device may further comprise: determining means for determining whether the motion picture receiving device itself is an encoding condition determination device, on the basis of the resource information stored in the storage means, the encoding condition determination device being a device that determines the encoding condition of image data transmitted from the motion picture transmitting device; wherein the control means determines the encoding condition on the basis of the resource information stored in the storage means, in a case that a determination result by the determining means is positive. Alternatively, in this embodiment, the motion picture receiving device may further comprise: priority calculating means for calculating a priority of the motion picture receiving device on the basis of the resource information stored in the storage means; wherein the control means determines the encoding condition on the basis of the priority calculated by the calculating means and the resource information stored in the resource information.

The present invention also provides a motion picture transmitting device, comprising: input means for inputting image data; encoding means for encoding the image data inputted by the input means; transmitting means for transmitting the image data encoded by the encoding means; and control means for determining an encoding condition of the image data by communication with a motion picture receiving device, and for controlling the encoding means to encode the image data in accordance with the encoding condition; wherein the control means determines, when the number of the motion picture receiving device changes, the encoding condition on the basis of the changed number of the motion picture receiving devices.

In one embodiment, the control means may control the encoding means to encode the image data.

The present invention also provides a motion picture decoding method, comprising the steps of: determining an encoding condition of image data to be received, by communicating with a motion picture transmitting device which is a source of the image data; decoding and outputting the received image data in accordance with the encoding condition determined at the determining step; updating the encoding condition, when the number of the motion picture transmitting device changes, on the basis of the changed number of the motion picture transmitting device.

The present invention also provides a motion picture encoding method, comprising the steps of: determining an encoding condition of image data to be transmitted, by communicating with a motion picture receiving device which is a destination of the image data; encoding and transmitting the image data in accordance with the encoding condition determined at the determining step; updating the encoding condition, when the number of the motion picture receiving device changes, on the basis of the changed number of the motion picture transmitting devices.

The present invention allows a motion picture receiving device to receive and decode the image data from one or a plurality of motion picture transmitting device, even in a case that the number of the motion picture transmitting device is changed. Furthermore, the present invention allows a motion picture transmitting device to encode and transmit the image data to one or a plurality of motion picture receiving device, even in a case that the number of the motion picture receiving device is changed.

PREFERRED EMBODIMENTS FOR CARRYING OUT THE INVENTION

Preferred embodiments of the present invention will now be described with reference to the figures. In the following description, like components are denoted by like numerals, as shown in the figures.

A. First Embodiment

A-1. Configuration
A-1-1. Configuration of Mobile Communication Terminal

FIG. 1 is a block diagram illustrating a hardware configuration of a mobile phone 10 in accordance with the first embodiment of the present invention. Mobile phone 10 is a motion picture (movie) receiving device and a motion picture sending device. As shown in FIG. 1, mobile phone 10 comprises: an imaging device 1; an encoder 2; a transmitter/receiver 3; a decoder 4; an image display device 5; a control unit 6; and a nonvolatile memory 7. In addition, mobile phone 10 comprises a keypad and a voice communication processing unit (neither of which is shown in the figures). The keypad has a plurality of keys for inputting numeric characters, and instructions to mobile phone 10. The keypad outputs a signal to control unit 6 in response to a keypad operation carried out by a user. The voice communication processing unit has a microphone, a speaker, and a voice processing unit. The voice communication processing unit carries out voice communication processes such as connecting/disconnecting a call under the control of control unit 6.

Imaging device 1 is, for example, a CCD (Charge Coupled Device) camera and outputs data of captured images to encoder 2. Image data (movie data) obtained by mobile phone 10 either from a mobile communication network or from nonvolatile memory 7, may be outputted to encoder 2 instead of from imaging device 1.

Encoder 2 encodes the image data outputted by imaging device 1 in accordance with a motion picture coding algorithm such as MPEG-4 Visual, H.263, or H.264/AVC. Encoder 2 outputs the encoded image data to transmitter/receiver 3.

Transmitter/receiver 3 controls wireless communication between mobile phone 10 and a base station in a mobile communication network. Transmitter/receiver 3 transmits to the base station motion picture data outputted from encoder 2, together with a communication address (for example, telephone number or IP (Internet Protocol) address) of the mobile phone 10 from which a call is initiated (source mobile phone 10). Thus, the motion picture data is transmitted from source mobile phone 10 to correspondent mobile station 10. Transmitter/receiver 3 receives from the base station motion picture data transmitted from the source mobile phone 10, and outputs the received motion picture data to decoder 4.

Transmitter/receiver 3 transmits to and receives from correspondent mobile phone 10, via the base station, further information such as motion picture coding algorithms supported by mobile phone 10, the maximum bit rate or the maximum frame rate, the maximum number of the reference frames, the maximum screen size of the motion picture, and so on. Mobile phone 10 determines an encoding condition, which is a condition for encoding/decoding motion picture data when communicating with source mobile phone 10, in accordance with the transmitted/received information. Correspondent mobile phone 10 stores in nonvolatile memory 7 identification data of source mobile phone 10 (for example, a telephone number, IP address, or a communication ID) in correspondence with the determined encoding condition.

The encoding condition defines, for example, a motion picture coding algorithm to be used, a bit rate, a frame rate, a number of reference frames, and screen size.

Decoder 4 decodes motion picture data outputted from transmitter/receiver 3, in accordance with an encoding condition determined by exchange of information with correspondent mobile phone 10. Decoder 4 outputs the decoded motion picture data to image display device 5. Image display device 5 has, for example, a liquid crystal display (LCD) panel and a driver circuit therefor. Image display device 5 displays a screen on an LCD panel, in accordance with the motion picture data decoded by the decoder 4.

Control unit 6 is connected to imaging device 1, encoder 2, transmitter/receiver 3, decoder 4, image display device 5, and nonvolatile memory 7. Control unit 6 has CPU, ROM, and RAM (none of which are shown in the figures). Control unit 6 controls each component of mobile phone 10 by running a program stored in the ROM or in nonvolatile memory 7. Nonvolatile memory 7 also stores programs (application software) for use, for example, in switching an encoding condition (described later with reference to FIG. 4), and for changing parameters for operation in encoder 2 and decoder 4.

A-1-2. Configuration of Encoder

Figure 2:
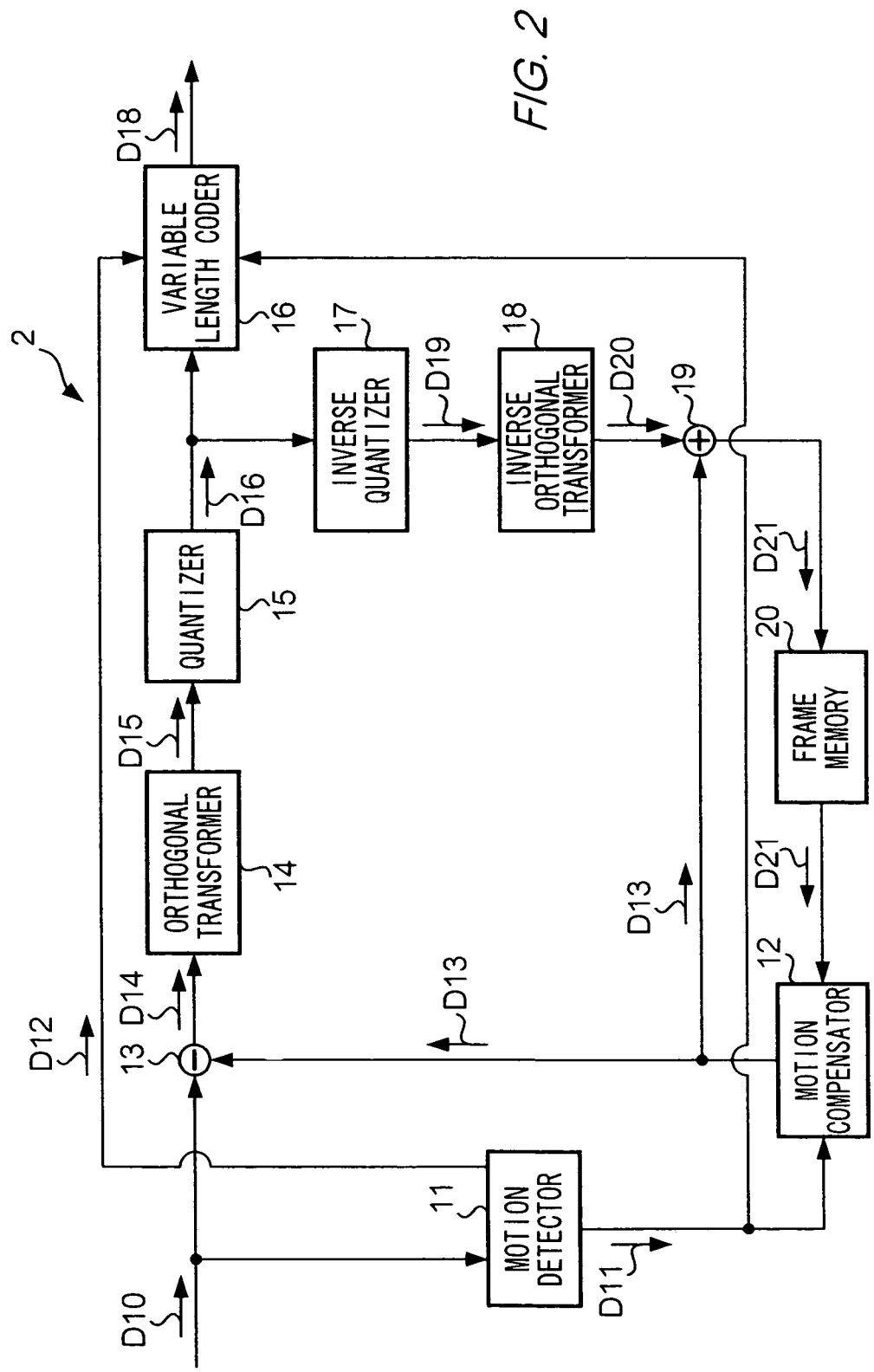

FIG. 2 is a block diagram illustrating a configuration of encoder 2. As shown in FIG. 2, frame image D10 is divided into a plurality of macro blocks, each of which is an image of 16×16 pixels. The divided frame image D10 is outputted to motion detector 11.

Motion detector 11 detects motion of an image for each macro block. Motion detector 11 compares an image of a macro block with an image of reference frame D21 stored in frame memory 20. Then, motion detector 11 locates an image area which is minimally different from the image of the macro block. Motion detector 11 generates motion vector D11 showing the motion of the located image. Motion detector 11 outputs motion vector D11 to motion compensator 12 and variable length coder 16. Motion detector 11 also outputs information (reference frame information D12) of reference frame D21 which was referred to in generating motion vector D11.

Motion detector 11 may divide the macro block into smaller image units, and detect motion of an image for each of the smaller image units. In a case of H.264/AVC, frame memory 20 stores a plurality of reference frames D21. Thus, in H.264/AVC, motion vector D11 is generated with reference to a plurality of reference frames D21.

Motion compensator 12 generates estimated image D13 on the basis of motion vector D11 outputted from motion detector 11 and reference frame D21 stored in frame memory 20, for each macro block. Subtractor 13 calculates a difference (estimated residual) between frame image D10 and estimated image D13 for each macro block, and outputs to orthogonal transformer 14 the calculated difference as estimated residual image D14. Orthogonal transformer 14 carries out orthogonal transformation on estimated residual image D14 of each orthogonal transformation block included in the macro block. Thus, orthogonal transformer 14 generates orthogonal transformation coefficient D15. Quantizer 15 generates quantized orthogonal transformation coefficient D16 by quantizing orthogonal transformation coefficient D15.

Variable length coder 16 outputs to transmitter/receiver 3 (FIG. 1) encoded image data D18 obtained by encoding quantized orthogonal transformation coefficient D16, motion vector D11 outputted from motion detector 11, and reference frame information D12.

Inverse quantizer 17 inversely quantizes quantized orthogonal transformation coefficient D16 outputted from quantizer 15, to thereby generate inversely quantized orthogonal transformation coefficient D19. Inverse orthogonal transformer 18 carries out inverse orthogonal transformation, thereby generating local decode residual image D20. Adder 19 adds local decode residual image D20 and estimated image D13 outputted from motion compensator 12, thereby generating reference frame image D21. Reference frame image D21 is stored in frame memory 20, and is used in inter-frame differential coding and motion compensation.

A-1-3. Configuration of Decoder

Figure 3:
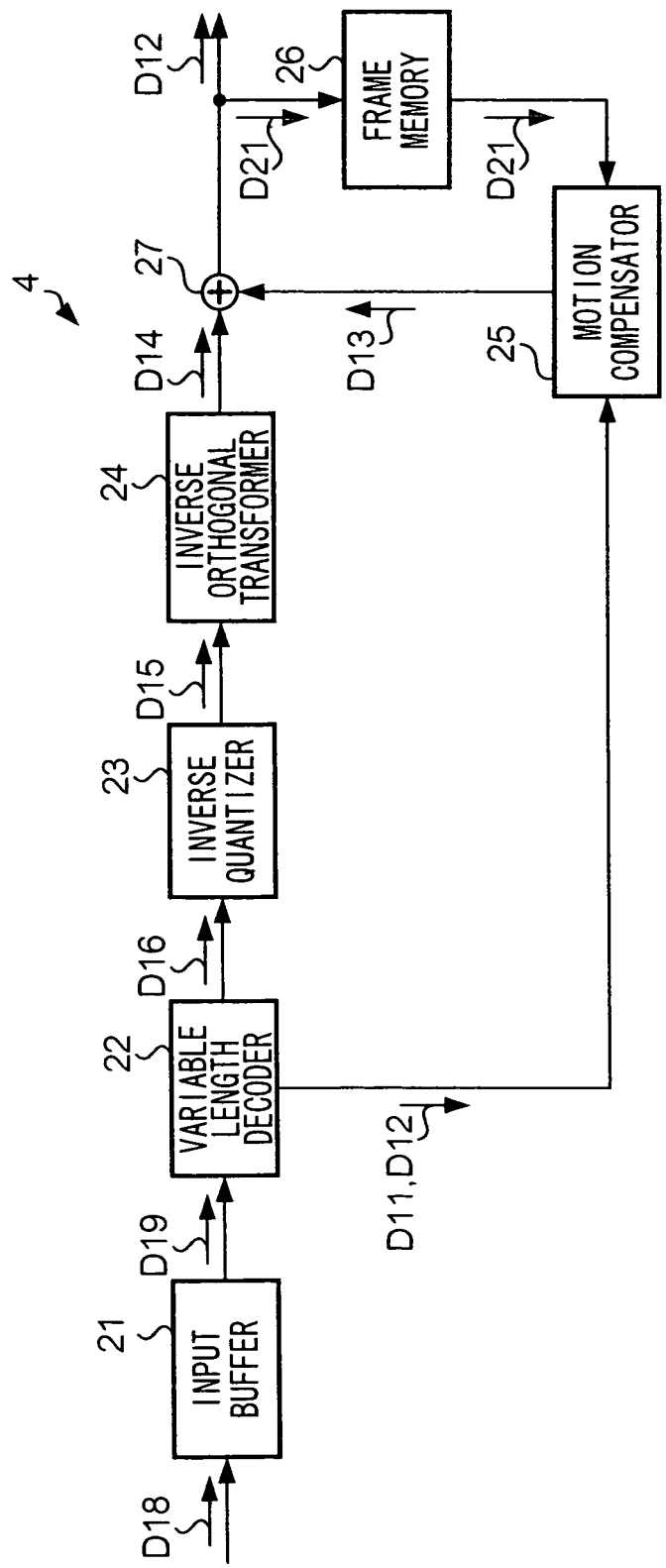

FIG. 3 is a block diagram illustrating a configuration of decoder 4. Encoded image data D18, which is encoded by source mobile phone 10 and then received by transmitter/receiver 3 and inputted to decoder 4, is stored in input buffer 21. A plurality of encoded image data D19 are integrated into an operated unit, which is referred to as encoded image data D19. Decoder 4 outputs encoded image data D19 to variable length decoder 22.

Variable length decoder 22 decodes motion vector D11, reference frame information D12, and quantized orthogonal transformation coefficient D16, from encoded image data D19 for each macro block. Here, quantized orthogonal transformation coefficient D16 is inversely quantized by inverse quantizer 23, whereby orthogonal transformation coefficient D15 is generated. Then, orthogonal transformation coefficient D15 is inversely orthogonal-transformed by inverse orthogonal transformer 24, whereby estimated residual image D14 is obtained.

Motion vector D11 and reference frame information D12, both of which are decoded by variable length decoder 22, are outputted to motion compensator 25. Motion compensator 25 generates estimated image D13 on the basis of motion vector D11, reference frame information D12, and reference frame image D21 stored in frame memory 26.

Adder 27 adds estimated image D13 and estimated residual image D14. Thus, frame images D12 and D21 are restored and are outputted to image display 5 (FIG. 1). Frame image D21 is stored in frame memory 26, and is used for inter-frame differential coding and motion compensation.

A-2. Operation

First, an operation for carrying out two-way communication with a motion picture between two mobile phones 10 will be described with reference to FIG. 1.

When an instruction for initiating a call with a motion picture is inputted via the keypad, or a request for initiating a call with motion picture is received, source mobile phone 10 identifies correspondent mobile phone 10. Then, source mobile phone 10 communicates information such as a motion picture encoding algorithm supported by correspondent mobile phone 10, a maximum bit rate or a maximum frame rate, a maximum reference frame number, and a maximum screen size of the motion picture. Then, source mobile phone 10 and correspondent mobile phone 10 determine an encoding condition for communication of a motion picture.

For example, source mobile phone 10 and correspondent mobile phone 10 determine as an encoding condition that the bit rate is set to a maximum writing rate of input buffer 21 in decoder 4 of one of the two mobile phones 10, and that the reference frame number is set to a value corresponding to a maximum storage capacity of frame memory 26 of one of the two mobile phones 10, because there is only one correspondent in this case. Thus, the encoding condition is set to the most efficient for two-way communication.

Source mobile phone 10 stores in nonvolatile memory 7 the determined encoding condition correspondingly with information for identifying the correspondent mobile phone 10. Source mobile phone 10 sets various parameters for encoder 2 and decoder 4 in accordance with the encoding condition stored in nonvolatile memory 7. Encoder 2 of source mobile phone 10 encodes image data obtained by imaging device 1, and transmitter/receiver 3 transmits the image data to correspondent mobile phone 10. Similarly, in correspondent mobile phone 10, image data is encoded and transmitted in accordance with the determined encoding condition. Mobile phone 10 receives image data in transmitter/receiver 3, decodes the data in decoder 4, and displays the image obtained by the decoding.

Thus, source mobile phone 10 transmits image data to and receives image data from correspondent mobile phone 10, as is the case with correspondent mobile phone 10, with respective transmitted/received image data being displayed after decoding on the respective mobile phones. In this way, two-way communication with image data between the phones is carried out. In the same way, the two mobile phones 10 also transmit/receive and process voice data.

Next, an operation for switching between two-way communication and three-way communication is described with reference to FIG. 4. In the present embodiment, it is assumed that two mobile phones 10 are in the process of two-way communication with a motion picture, and a third mobile phone 10 calls one of the two mobile phones 10 to initiate three-way communication.

In the present embodiment, source mobile phone 10, which is in the process of two-way communication and receives a new call from a third mobile phone 10 is referred to as "first mobile phone 10", and correspondent mobile phone 10 which is in the process of two-way communication with first mobile phone 10 is referred to as "second mobile phone 10". FIG. 4 is a flow chart illustrating an operation carried out by control unit 6 of first mobile phone 10.

Figure 4:
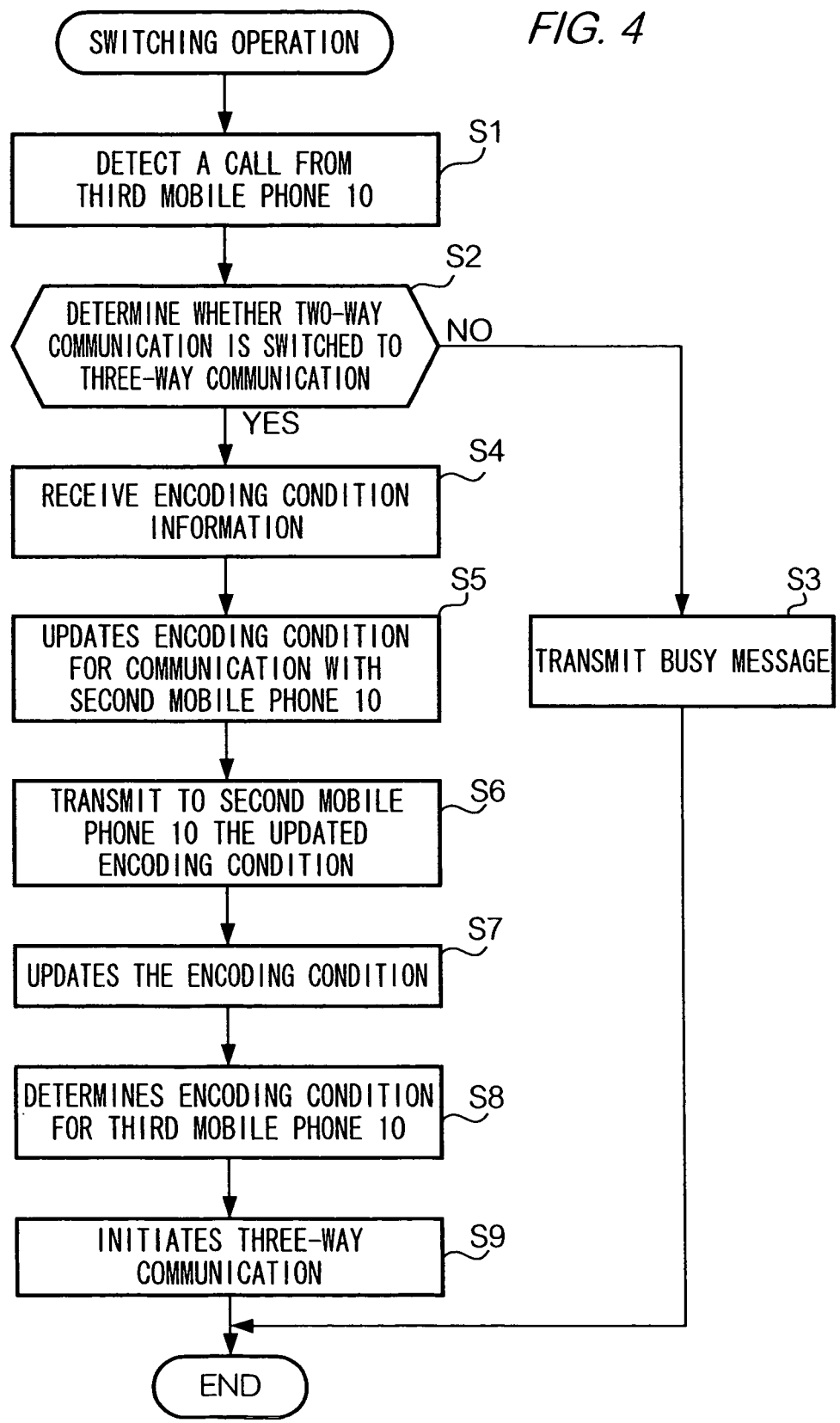

As shown in FIG. 4, when first mobile phone 10 detects (step S1) a call from third mobile phone 10, first mobile phone 10 determines (step S2) whether two-way communication is switched to three-way communication. If, for example, an instruction to maintain the two-way communication is inputted via the keypad, first mobile phone 10 determines (step S2: NO) that two-way communication is not switched to three-way communication. In this case, a busy message is transmitted (step S3) to third mobile phone 10 and the operation shown in FIG. 4 ends.

In a case that an instruction to switch two-way communication to three-way communication is inputted, first mobile phone 10 determines (step S2: YES) to switch two-way communication to three-way communication. In this case, first mobile phone 10 first receives, from second mobile phone 10, information such as motion picture coding algorithms supported by second mobile phone 10, a maximum bit rate or a maximum frame rate, a maximum reference frame number and a maximum screen size of the image data (step S4).

Then, first mobile phone 10 updates (step S5) the encoding condition for communication with second mobile phone 10 on the basis of the encoding resource information and the number of correspondent mobile phones 10 (two, in the present case), to attain the most efficient encoding condition.

For example, if two-way communication is switched to three-way communication with the same bit rate, more data needs to be communicated than during two-way communication. Encoding conditions such as bit rate are set to the most efficient value, for example, a higher writing rate for input buffer 21 of decoder 4 in first or second mobile phone 10. Therefore, for three-way communication, the bit rate for communication with the second mobile phone 10 is changed to half of the bit rate for two-way communication.

Also, for two-way communication, the reference frame number is set to a value corresponding to the storage capacity of frame memory 26 of decoder 4 in first or second mobile phone 10. For three-way communication, a number of frame memories are required for storing the reference frames for third mobile phone 10 to decode the image data. Therefore, for example, the frame memory number for third mobile phone 10 is set to half of the storage capacity of frame memory 26, and the frame memory number for second mobile phone 10 is changed to half of the storage capacity of frame memory 26.

Then, first mobile phone 10 transmits (step S6) to second mobile phone 10 the updated encoding condition. When first mobile phone 10 receives a signal showing acceptance of the updated encoding condition from second mobile phone 10, first mobile phone 10 updates (step S7) the encoding condition to the new encoding condition determined in step S5 above.

When second mobile phone 10 receives the encoding condition for three-way communication, second mobile phone 10 updates the encoding condition to the new encoding condition. Second mobile phone 10 updates the various parameters for encoder 2 and decoder 4 in response to the updated encoding condition.

For example, in this case, second mobile phone 10 changes the bit rate to half of that for two-way communication, by changing the quantized parameter for quantizer 15 in encoder 2. Also, second mobile phone 10 changes the reference frame number to half of that for two-way communication, and controls the components of the encoder 2 to carry out encoding in accordance with the updated reference frame number.

After step S7 described above, first mobile phone 10 communicates with third mobile phone 10 and determines (step S8) the encoding condition for third mobile phone 10. The operation at step S8 is basically the same as that for two-way communication, the only difference being that the encoding condition is set to enable three-way communication.

When the encoding condition (for three-way communication) for third mobile phone 10 is determined at step S8, first mobile phone 10 stores the encoding condition data in nonvolatile memory correspondingly with the information for identifying third mobile phone 10. First mobile phone 10 sets various parameters for encoder 2 and decoder 4 in accordance with the encoding conditions for second mobile phone 10 and third mobile phone 10 stored in nonvolatile memory 7. Then, first mobile phone 10 initiates (step S9) three-way communication in accordance with the new encoding condition.

According to the present embodiment, the encoding condition is appropriately changed when switching from two-way communication to three-way communication. For example, input buffer 21 of first mobile phone 10 is appropriately shared by second and third mobile phones 10, whereby all of the image data received from second and third mobile phones 10 can be stored in input buffer 21 in decoder 4 of first mobile phone 10. Also, according to the present embodiment, a storage area for storing reference frames for both of second and third mobile phones 10 can be reserved in frame memory 26 in decoder 4 of first mobile phone 10.

Thus, first mobile phone 10 can set the most efficient encoding condition in response to the number of mobile phones which join multi-way communication, even when a number of mobile phones changes.

Referring to FIG. 4, in the present embodiment, the operation when two-way communication is changed to three-way communication, mobile phone 10 may determine an encoding condition for changing three-way communication to four-way communication, or for changing three-way communication to two-way communication, in response to a number of correspondent mobile phones 10. In a case that all of mobile phones 10 taking part in the multi-way communication have the same specifications, the encoding condition may be as follows: for three-way communication, the bit rate may be the half of that for two-way communication; for four-way communication, the bit rate may be one third of that for two-way communication; similarly, for three-way communication, the reference frame number may be half of that for two-way communication; and for four-way communication, the reference frame number may be one third of that for two-way communication.

As described above, when the number of mobile phones 10 taking part in multi-way communication changes, e.g., from two-way communication to three-way communication, mobile phone 10 determines an encoding condition for image data to be communicated, on the basis of the changed number of mobile phones 10 taking part in the multi-way communication.

Regarding image data receiving function of mobile phone 10, mobile phone 10 determines the encoding condition for receiving the image data from the correspondent mobile phones 10 after communicating with each correspondent mobile phone 10 when the number of mobile phones taking part in the multi-way communication is changed.

Similarly, regarding image data transmitting function of mobile phone 10, mobile phone 10 determines the encoding condition for transmitting the image data to the correspondent mobile phones 10 after communicating with each correspondent mobile phone 10 when the number of mobile phones taking part in the multi-way communication is changed.

Furthermore, according to the present embodiment, mobile phone 10 determines and changes the encoding condition on the basis of the encoding resource information such as motion picture coding algorithms supported by mobile phone 10, a maximum bit rate or a maximum frame rate, a maximum reference frame number, and a maximum screen size of the image data. Therefore mobile phone 10 determines the encoding condition on the basis of the encoding capability, decoding capability, and the number of mobile phones 10 taking part in the multi-way communication.

Additionally, in a case that the number of mobile phones 10 taking part in the multi-way communication increases, mobile phone 10 determines the new encoding condition before the two-way communication is switched to the three-way communication.

Therefore, according to the present embodiment, switching two-way communication to three-way communication is smoothly carried out because the encoding condition is updated for three-way communication before switching is carried out.

Also, in a case that the number of mobile phones 10 taking part in multi-way communication decreases, mobile phone 10 determines the new encoding condition after three-way communication is switched to the two-way communication. Alternatively, in this case of the number of mobile phones 10 taking part in multi-way communication decreasing, the encoding condition may not be changed but maintained.

In the present embodiment, the above described switching operation (FIG. 4) is carried out by CPU in control unit 6 by running programs stored in nonvolatile memory 7 or ROM in control unit 6. The programs may be provided to mobile phone 10 via communication with other devices. Alternatively, the programs may be provided via a storage medium.

B. Second Embodiment

Figure 6A:
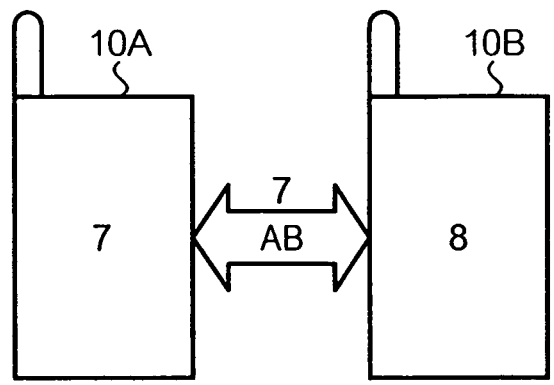
Figure 6B:
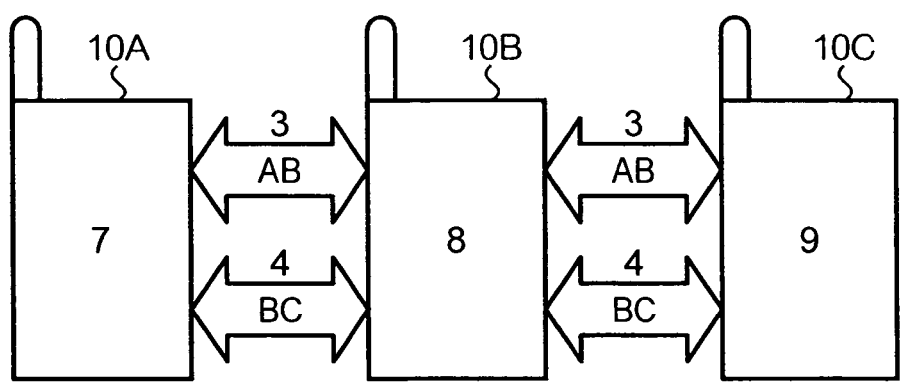
Figure 6C:
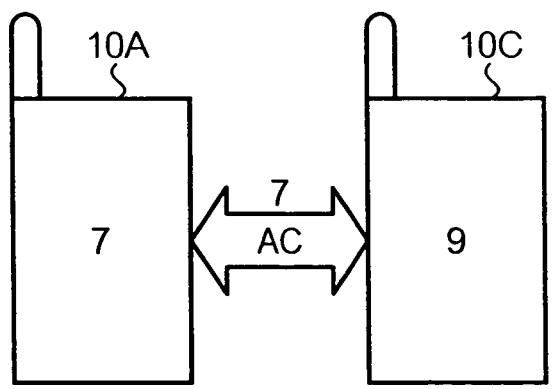

The second embodiment of the present invention will be described in this section. FIG. 6 illustrates multi-way communication in accordance with the present embodiment. In this embodiment, the method for determining a terminal which determines the encoding condition and the method for notifying encoding resource information are different from those of the first embodiment. In this embodiment, description will be given of the operation for switching multi-way communication from two-way communication, to three-way communication, and back to two-way communication. In this embodiment, the first, the second, and the third mobile phone 10 are referred to as mobile phone 10A, mobile phone 10B, and mobile phone 10C, respectively. A maximum reference frame number of each of mobile phones 10A, 10B, and 10C, for encoding and decoding, is seven, eight, and nine, respectively. Therefore, the total number of reference frames of mobile phones 10A, 10B, and 10C is fourteen, sixteen, and eighteen, respectively. Further, to simplify the description, only the reference frame number is considered as the encoding resource, although other parameters such as bit rate, frame rate, or screen size may also be considered as the encoding resource. Although the reference frame number for encoding and that for decoding are the same in the present embodiment, these two reference frame numbers may be different from each other.

In the description below, the term "reference frame number" refers to a reference frame number for encoding when the description is given for an encoding operation, and to a reference frame number for decoding when the description is given for a decoding operation.

The description of the configuration of mobile phone 10, which is a motion picture transmitting device and a motion picture receiving device in accordance with the present embodiment, will be omitted because it is the same as that of the first embodiment. Each component of the first, the second and the third mobile phone 10 are distinguished by subscript A, B, and C, respectively.

B-1. Initiation of Two-Way Communication

First, mobile phones 10A and 10B initiate two-way communication similarly to the first embodiment. When mobile phone 10A receives a request to initiate a call with motion picture, mobile phone 10B identifies mobile phone 10B as a correspondent. Then, mobile phone 10A transmits its encoding resource information to mobile phone 10B. When mobile phone 10B receives the encoding resource information of mobile phone 10A, control unit 6B of mobile phone 10B compares the received encoding resource information of mobile phone 10A with the encoding resource information of mobile phone 10B. If mobile phone 10B has more resource information than mobile phone 10A, control unit 6B updates condition determination terminal information with terminal identification information (for example, telephone number, IP address, or terminal ID) of mobile phone 10B. The condition determination information is information indicating a terminal which determines the encoding condition. On the other hand, if mobile phone 10B has less encoding resource than mobile phone 10A, control unit 6B updates the condition determination terminal information with terminal identification information. Then, mobile phone 10B transmits to mobile phone 10A the updated condition determination terminal information.

When mobile phone 10A receives the condition determination terminal information, control unit 6A stores the received condition determination terminal information in nonvolatile memory. Control unit 6A determines whether mobile phone 10A itself is a condition determination terminal on the basis of the condition determination terminal information. In the present embodiment, the condition determination terminal information indicates mobile phone 10B because mobile phone 10B has more encoding resource than mobile phone 10A. Therefore, mobile phone 10B is a condition determination terminal.

Control unit 6B of mobile phone 10B determines an encoding condition which is suitable for a terminal which has less encoding resource. In the present embodiment, control unit 6B determines that a reference frame number to be used is seven as the encoding condition, because the maximum reference frame numbers of mobile phone 10A and mobile phone 10B are seven and eight, respectively. Mobile phone 10B transmits the determined encoding condition to mobile phone 10A. Control unit 6A of mobile phone 10A stores in nonvolatile memory 7A the received encoding condition correspondingly with the terminal identification information of mobile phone 10B. Thus, mobile phone 10A and mobile phone 10B initiate two-way communication with motion picture in accordance with the encoding condition (see FIG. 6a). In FIG. 6, each mobile phone 10 is labeled with a number indicating its maximum reference frame number. Also, arrows are labeled with characters indicating which terminals are in communication. For example, "AB" shows communication between mobile phone 10A and mobile phone 10B. Numerals on the arrows show the reference frame number used in communication between two terminals.

B-2. Switching Two-Way Communication to Three-Way Communication

In the present embodiment, mobile phone 10C calls mobile phone 10A when mobile phone 10A and mobile phone 10B are carrying out two-way communication. FIG. 7 shows a flow chart illustrating an operation for increasing terminals taking part in multi-way communication in accordance with the present embodiment. When mobile phone 10A receives a call (step S21), in a case that an instruction for switching to three-way communication via the keypad is inputted (step S22: YES), control unit 6A of mobile phone 10A determines to switch to three-way, communication, similarly to the first embodiment. An operation in a case that three-way communication is refused, is similar to that of the first embodiment.

When an instruction for switching to three-way communication is provided, control unit 6A reads the condition determination terminal information from nonvolatile memory 7A. Mobile phone 10A transmits the condition determination terminal information to mobile phone 10C. Control unit 6C of mobile phone 10C identifies mobile phone 10B as the condition determination terminal, on the basis of the received condition determination terminal information. Control unit 6C transmits (step S23) its encoding resource information with a request for multi-way communication with mobile phone 10A, to the condition determination terminal, which is mobile phone 10B in this case.

In the present embodiment, the condition determination terminal in two-way communication remains the same as the condition determination terminal in three-way communication. Namely, mobile phone 10B determines (step S24) that the condition determination terminal is mobile phone 10B itself. In another embodiment, a new condition determination terminal may be determined on the basis of encoding resource information of all terminals to take part in multi-way communication.

When mobile phone 10B receives the request for multi-way communication, control unit 6B stores in nonvolatile memory 7B the encoding resource information received with the request for multi-way communication. Mobile phone 10B, the condition determination terminal, determines (step S25) a new encoding condition for three-way communication, on the basis of the resource information of mobile phones 10A, 10B, and 10C stored in nonvolatile memory 7B and the number of terminals to take part in multi-way communication. Namely, the condition determination terminal determines the encoding condition for a terminal having the least encoding resource to be able to carry out multi-way communication. In the present embodiment, the encoding condition is determined to share the least encoding resource by all of the terminals to take part in multi-way communication. Mobile phone 10A has the lowest reference frame number, seven, among mobile phones 10A, 10B, and 10C. Therefore, control unit 6B determines as the new encoding condition that the reference frame number used for communication between two terminals is a maximum integer number beyond a solution obtained by dividing the lowest reference frame number by n−1. Here, n is the number of terminals to take part in multi-way communication. Then the remainder of the reference frames are allocated to the other terminal. In the present embodiment, three reference frames are set to be used in communication between mobile phones 10A and 10B, and four reference frames are set to be used in communication between mobile phones 10B and 10C, as a new encoding condition. Control unit 6B stores in nonvolatile memory 7B the determined encoding condition. Here, control unit 6B stores the new encoding condition for communication between mobile phones 10A and 10B (hereinafter referred to as "A-B encoding condition") correspondingly with the terminal identification information of mobile phone 10A. Similarly, control unit 6B stores the new encoding condition for communication between mobile phone 10B and 10C (hereinafter referred to as "B-C encoding condition") correspondingly with the terminal identification information of mobile phone 10C.

Control unit 6B transmits (step S26) the A-B encoding condition to mobile phone 10A. Control unit 6A stores in nonvolatile memory 7A the received A-B encoding condition correspondingly with the terminal identification information of mobile phone 10B. Mobile phones 10A and 10B communicate (step S27) in accordance with the new encoding condition. In the present embodiment, the encoding condition is transmitted to other terminals as sequence header information, frame header information, or slice header information. In another embodiment, nonvolatile memory 7 may store a plurality of parameter sets, each of which corresponds to a connection state such as a number of mobile phones taking part in multi-way communication, and mobile phone 10 may transmit a parameter set ID indicating one of the plurality of parameter sets.

After the encoding condition between mobile phones 10A and 10B is updated, mobile phone 10B, the condition determination terminal, transmits the B-C encoding condition to mobile phone 10C. When mobile phone 10C receives the B-C encoding condition, control unit 6C stores in nonvolatile memory 7C the B-C encoding condition correspondingly with the terminal identification information of mobile phone 10B. Mobile phones 10B and 10C communicate (step S28) in accordance with the B-C encoding condition.

In the present embodiment, image data in the multi-way communication is communicated via the condition determination terminal (mobile phone 10B in this case). Namely, mobile phone 10B relays image data from mobile phone 10C to mobile phone 10B. Here, the encoding condition for transmitting to mobile phone 10A image data generated at mobile phone 10C is the same as the B-C encoding condition. Similarly, mobile phone 10B relays image data from mobile phone 10A to mobile phone 10C. Mobile phone 10A receives the image data from mobile phone 10C and mobile phone 10C receives the image data from mobile phone 10A. Thus, three-way communication between mobile phones 10A, 10B, and 10C is carried out (step S29, and see FIG. 6b).

B-3. Switching Three-Way Communication to Two-Way Communication

Figure 8:
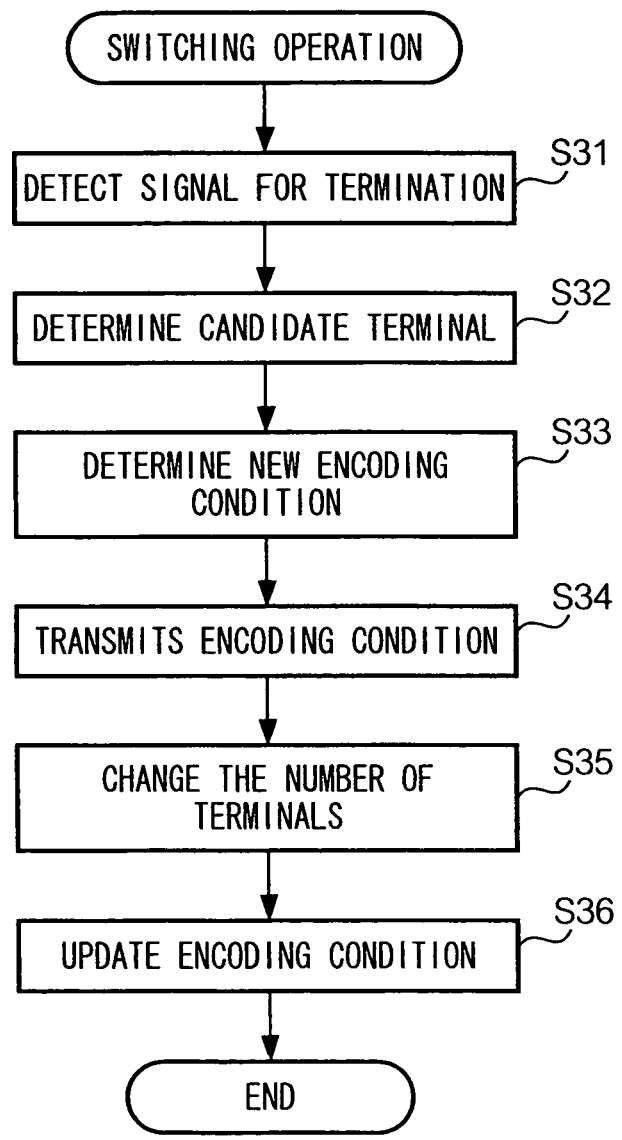

Next, an operation will be described for switching three-way communication to two-way communication, for example, in a case that a user of mobile phone 10B terminates a call during three-way communication between mobile phones 10A, 10B, and 10C. FIG. 8 is a flow chart illustrating an operation for decreasing a number of terminals taking part in multi-way communication in accordance with the present embodiment.

When the user of mobile phone 10B inputs, via the keypad, an instruction terminating the call, a signal for terminating the call is outputted to control unit 6B. Control unit 6B detects (step S31) the signal and then determines (step S32) a candidate terminal which will be the condition determination terminal after the number of terminals decreases. Namely, control unit 6B reads the condition determination terminal information from nonvolatile memory 7B. Then, control unit 6B determines whether mobile phone 10B itself is the condition determination terminal in three-way communication. In the present embodiment, the result of the determination is positive because mobile phone 10B is the condition determination terminal. In this case, control unit 6B reads all of the encoding resource information except mobile phone 10B. Then, control unit 6 extracts the maximum encoding resource. Control unit 6 determines that a terminal having the maximum encoding resource, other than mobile phone 10B, is the next condition determination terminal. In this case, mobile phone 10C is determined to be the next condition determination terminal.

Control unit 6B transmits to mobile phone 10C, the candidate of the next condition determination terminal, the encoding resource information of other terminals as well as the terminal identification information of the other terminals and a request for determining the condition determination terminal. In the present embodiment, control unit 6B transmits to mobile phone 10C the encoding resource information and the terminal identification information of mobile phone 10A.

When mobile phone 10C receives the request for determining the condition determination terminal, control unit 6C updates the condition determination terminal information with the terminal identification information of mobile phone 10C. Next, control unit 6C determines (step S33) the encoding condition for mobile phone 10A in a similar way to that described above. Namely, control unit 6C determines the encoding condition to use seven encoding condition. Control unit 6C determines transmits (step S34) to mobile phone 10B the determined encoding condition with the condition determination terminal information indicating that the mobile phone 10C is the next condition determination terminal.

Control unit 6A of mobile phone 10A stores in nonvolatile memory 7A the received encoding condition and the condition determination terminal information. Mobile phone 10A establishes a connection to mobile phone 10C, which is the new condition determination terminal, and ends communication with mobile phone 10B. After ending communication with mobile phone 10B, mobile phone 10A starts to communicate with mobile phone 10C, the communication including transfer of image data. At this point, three-way communication is carried out via mobile phone 10C. Furthermore, the active encoding condition is not the new encoding condition for two-way communication but the encoding condition for three-way communication. After the relaying terminal is changed from mobile phone 10B to mobile phone 10C, control unit 6A transmits to mobile phone 10C a signal indicating that the preparation for updating the encoding condition has been completed.

When mobile phone 10C receives a signal from all of the other terminals except the terminal terminating the call, control unit 6C transmits to mobile phone 10B a signal indicating that the preparation for updating the encoding condition has been completed. When mobile phone 10B receives the signal, mobile phone 10B ends communication with mobile phone 10C (step S35). At this point, mobile phone 10C is the only correspondent with mobile phone 10B. Thus, mobile phone 10B withdraws from multi-way communication.

When control unit 6C of mobile phone 10C detects termination of communication by mobile phone 10B, control unit 6C updates (step S36) the encoding condition with that for two-way communication. Furthermore, control unit 6C transmits to mobile phone 10A a signal instructing the update of the encoding condition. Control unit 6A of mobile phone 10A updates the encoding condition with that for two-way communication. Thus, mobile phones 10A and 10C initiate two-way communication in accordance with the new encoding condition.

If a terminal hanging up multi-way communication is not the condition determination terminal (namely, the result of the determination is negative at step S32), the terminal may transmit a request for terminating communication. After the terminal terminates communication, the condition determination terminal, which is the same in both three-way communication and in two-way communication, may determine the new encoding condition.

C. Third Embodiment

Generally, an operation in accordance with the present invention is as follows. First, terminals taking part in multi-way calling exchange encoding resource information. Next, a terminal determines the encoding condition in an ascending order of available number of reference frames (encoding resource). Then, the image data is transmitted directly between all terminals.

Figure 9A:
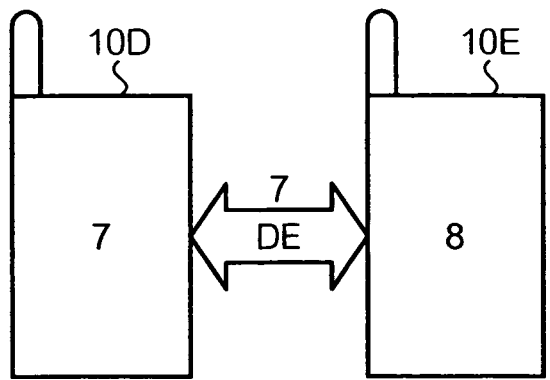
Figure 9B:
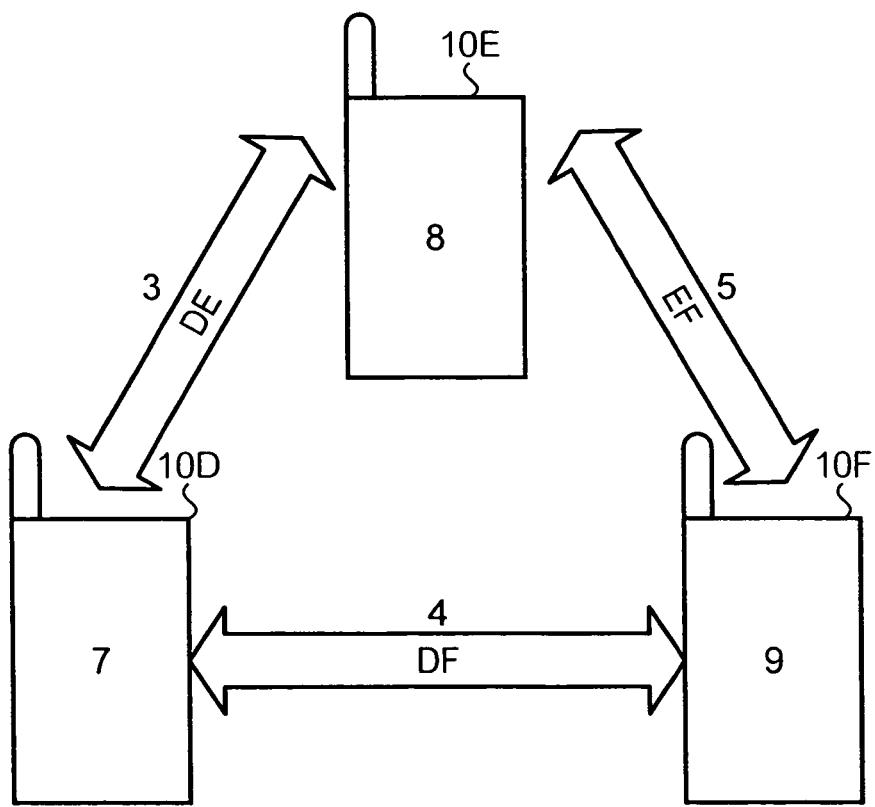
Figure 10:
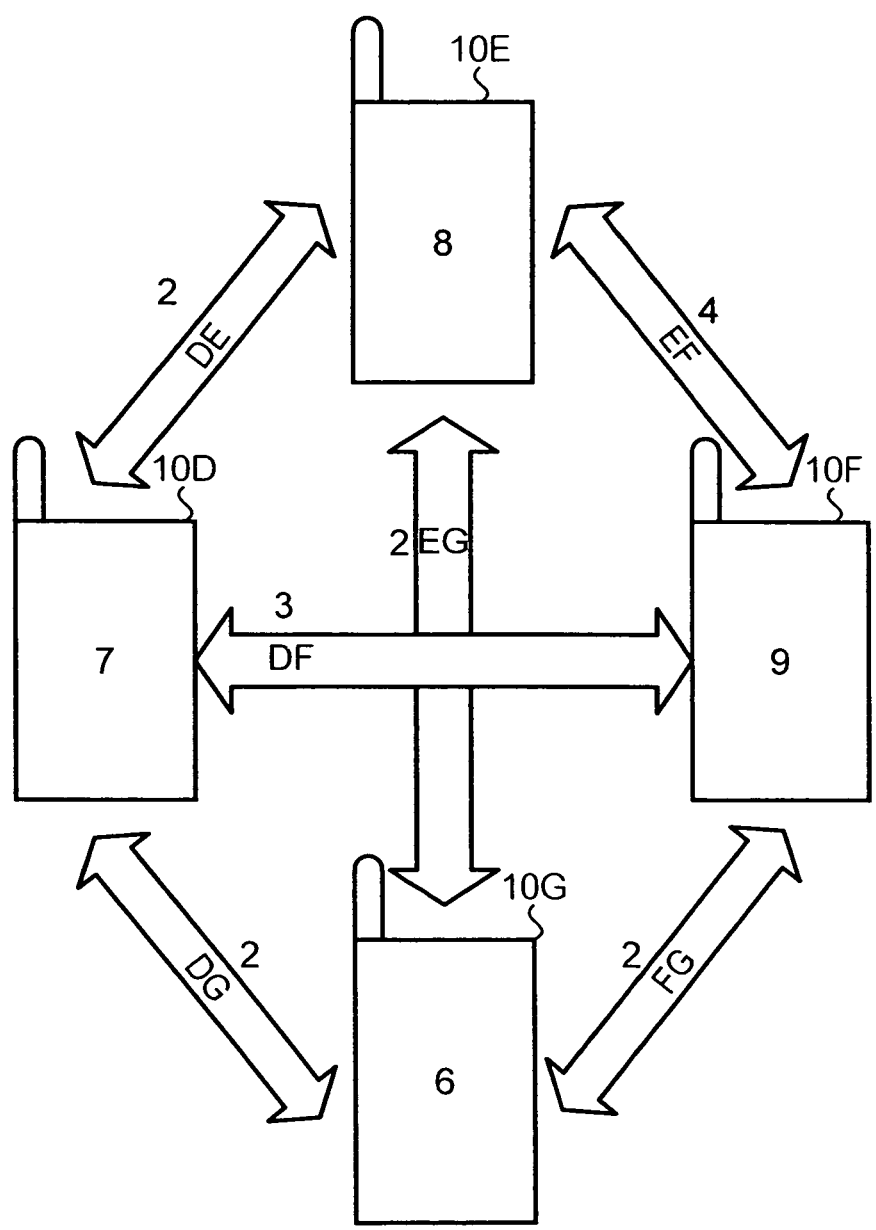

FIG. 9 and FIG. 10 are schematic diagrams illustrating multi-way calling in accordance with the present embodiment. In this embodiment, the first, the second, the third, and the fourth mobile phone 10 are referred to as mobile phone 10D, 10E, 10F, and 10G, respectively. A maximum reference frame number of each of mobile phones 10D, 10E, 10F, and 10G, for encoding and decoding, is seven, eight, nine, and six, respectively. Therefore, the total reference frame number of mobile phones 10D, 10E, 10F, and 10C is fourteen, sixteen, eighteen, and twelve, respectively. Description of the configuration of mobile phone 10 will be omitted because the configuration of mobile phone 10 is the same as that in the first and the second embodiment. Each component of mobile phones 10D, 10E, 10F, and 10G are distinguished by subscript D, E, F, and G, respectively. Detailed description of the operation is as follows.

C-1. Initiating Two-Way Communication

First, mobile phone 10D and 10E start two-way communication, similarly to the first embodiment. For example, when mobile phone 10D receives a request for a call with motion picture, control unit 6D of mobile phone 10D transmits to mobile phone 10E the encoding resource information of mobile phone 10D itself. Similarly, mobile phone 10E transmits to mobile phone 10D the encoding resource information of mobile phone 10E itself.

Mobile phones 10D and 10E store respectively in nonvolatile memory 7D and 7E the received encoding resource information of other terminals in a correspondent table. Control unit 6D determines whether mobile phone 10D itself has the minimum encoding resource on the basis of the encoding resource information of other terminals stored in nonvolatile memory 7D and the encoding resource information of mobile phone 10D. Similarly, control unit 6E determines whether mobile phone 10E itself has the minimum encoding resource. In the present embodiment, mobile phone 10D has less encoding resource than mobile phone 10E. Therefore, control unit 6D determines that mobile phone 10D itself has the minimum encoding resource among the terminals taking part in multi-way communication. Similarly, control unit 6E determines that mobile phone 10E does not have the minimum encoding resource among the terminals taking part in multi-way communication.

When control unit 6D determines that mobile phone 10D has the minimum encoding resource, control unit 6D determines the encoding condition for communicating with another terminal, on the basis of the encoding resource of mobile phone 10D itself and the number of terminals taking part in multi-way communication. In this case, control unit 6D determines as the encoding condition to use all of the encoding resource of mobile phone 10D. Namely, control unit 6D determines to use seven reference frames, as the D-E encoding condition. Control unit 6D transmits to mobile phone 10E the determined D-E encoding condition. Control unit 6E receives the D-E encoding condition and stores in nonvolatile memory 7E the received D-E encoding condition correspondingly with the terminal identification information of mobile phone 10D. Mobile phones 10D and 10E carry out two-way communication with motion picture in accordance with the encoding condition determined as described above (FIG. 9a).

C-2. Switching Two-Way Communication to Three-Way Communication

Figure 11:
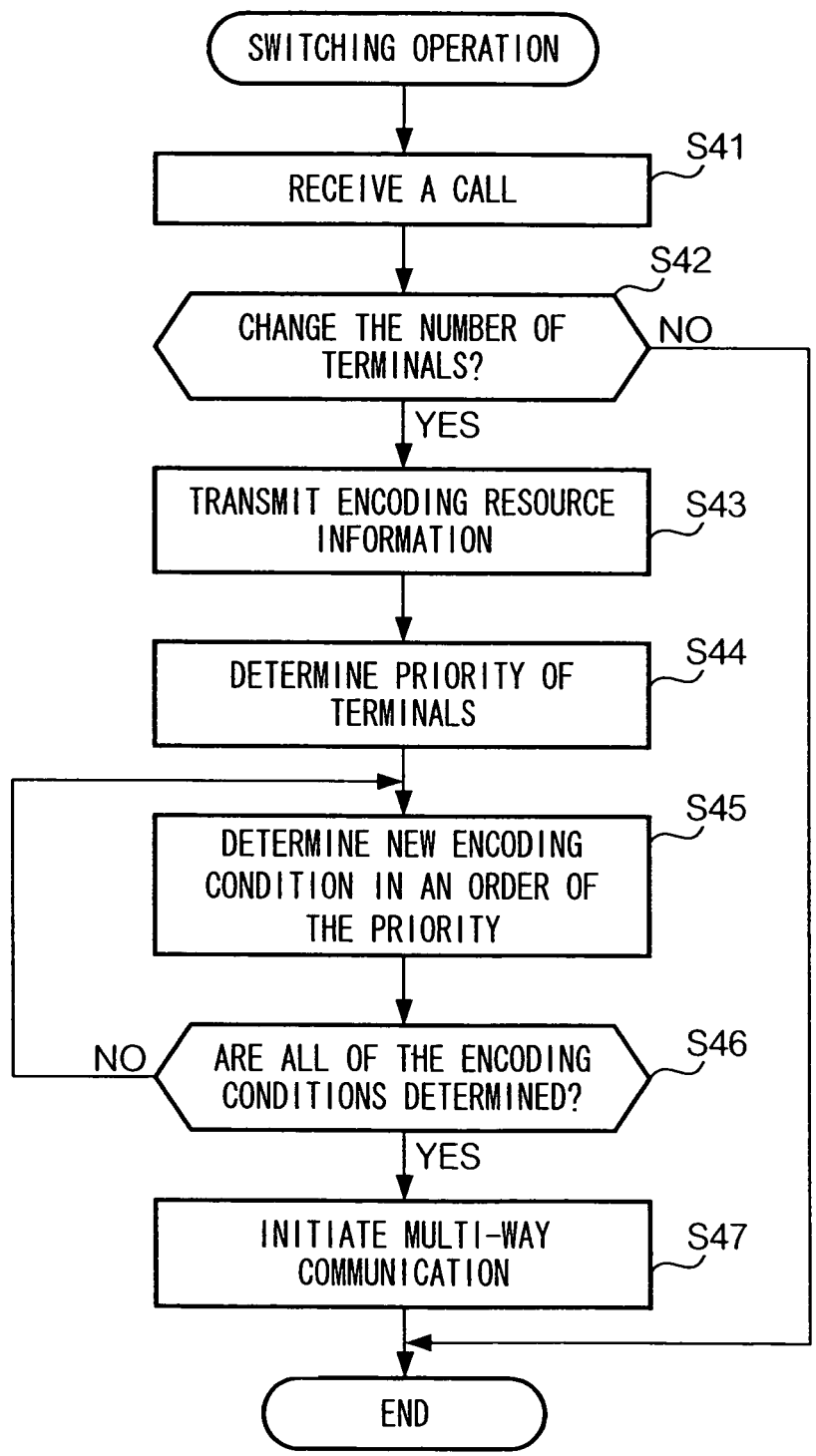

Next, an operation will be described for mobile phone 10F to take part in multi-way communication with mobile phones 10D and 10E. FIG. 11 is a flow chart illustrating an operation for increasing the number of terminals taking part in multi-way communication in accordance with the multi-way communication system of the present embodiment. When mobile phone 10D receives (step S41) a request for multi-way communication, control unit 6D determines to switch two-way communication to three-way communication in a case that an instruction to switch is inputted (step S42: YES) via the keypad. An operation in a case that an instruction not to switch to three-way communication, is similar to that of the first and the second embodiments.

When an instruction for switching to three-way communication is inputted, control unit 6D transmits to mobile phone 10F correspondent table stored in nonvolatile memory 7D as well as a request for the encoding resource information. When mobile phone 10F receives the request, control unit 6F of mobile phone 10F stores in nonvolatile memory 7F the received correspondent table and adds the terminal identification information of mobile phone 10D into the correspondent table. Control unit 6F transmits (step S43) the encoding resource information of mobile phone 10F itself to the terminals (in this embodiment, mobile phones 10D and 10E) recorded in the correspondent table. When mobile phones 10D and 10E receive the encoding resource information of mobile phone 10F, control units 6D and 6E add the received terminal identification information and the encoding resource information into their correspondent tables.

Control unit 6 of each mobile phone 10 taking part in multi-way communication calculates (step S44) its own priority, on the basis of the encoding resource information recorded in the correspondent table and its own resource information. In the present embodiment, the priority is given in an ascending order of available reference frame (the encoding resource). Therefore, control units 6D, 6E, 6F calculate their own priority as the first, the second, and the third, respectively.

When control unit 6D determines that the priority of mobile phone 10D is the first, control unit 6D determines (step S45) the encoding condition for communication with other terminals, namely, D-E encoding condition and D-F encoding condition. Since the maximum reference frame number is seven, the terminals (mobile phones 10D and 10E in the present embodiment) having a priority lower than the terminal of interest share the seven reference frames. Control unit 6D divides the maximum reference frame number by the correspondent terminal number, and allocates a number of reference frames to the terminal having the second priority, the number being the maximum integer below the solution. Furthermore, control unit 6D allocates the remainder of reference frames to the terminal having the third priority. Namely, control unit 6D allocates three reference frames for communication with mobile phone 10E and four reference frames for communication with mobile phone 10F. Control unit 6D transmits to the correspondent terminals the determined D-E encoding condition and D-F encoding condition, respectively. When mobile phones 10E and 10F receive the encoding condition from mobile phone 10D, control units 6E and 6F store in nonvolatile memories 7E and 7F the received encoding condition.

When mobile phone 10E, the second priority terminal, receives (step S46: NO) the encoding condition from mobile phone 10D, the first priority terminal, control unit 6E determines (step S45) the encoding condition for communication with the other terminals. In the present embodiment, the E-F encoding condition is not yet determined at this stage. Here, the available reference frame number is five because three reference frames have been reserved for communication with mobile phone 10D. Therefore, control unit 6E determines to use five reference frames in communication with mobile phone 10E, as the E-F encoding condition. Control unit 6E transmits to mobile phone 10F the determined E-F encoding condition. When mobile phone 10F receives the E-F encoding condition, control unit 6F stores in nonvolatile memory 7F the received E-F encoding condition. Thus, all of the encoding conditions are determined (step S46: YES).

As described above, each of mobile phone 10D, 10E, and 10F which takes part in the multi-way communication determines the encoding condition for communication with another terminal. Mobile phones 10D, 10E, and 10F communicate (step S47 and FIG. 9b) data including image data in accordance with the determined encoding condition, directly between all terminals.

C-3. Switching Three-Way Communication to Four-Way Communication

An operation for switching three-way communication to four-way communication is similar to that for switching two-way communication to three-way communication. In the present embodiment, mobile phone 10G whose maximum reference frame number is six, takes part in multi-way communication. In this case, at step S44 in FIG. 11, the order of priority of mobile phones is 10G, 10D, 10E, and 10F. Thus, the terminals one by one determine the encoding condition for communication with another terminal. Finally, four-way communication is carried out as illustrated in FIG. 10.

As described above, the terminals exchange their own encoding resource information, and one by one determine the encoding condition in increasing order of the encoding resource. Furthermore, call data including motion picture is not communicated via a certain terminal, but is communicated between terminals. Thus, the call data including motion picture can be communicated more appropriately because a terminal having more resource information can use more encoding resource.

Although only the reference frames are considered as the encoding resource, one or more other parameters can be considered as the encoding resource. In this case, the priority may be given on the basis of a parameter or on the basis of a synthesized parameter.

D. Modifications

Preferred embodiments of the present invention are described above, but the present invention is not restricted to the above embodiments. For example, the following modifications are possible.

D-1. First Modification

In two-way communication, the received image (motion picture) may be displayed on the whole screen of the LCD of mobile phone 10 because mobile phone 10 has only one correspondent terminal. In three-way communication, the screen may be divided into two parts, and each part may display an image received from a correspondent.

It is preferable that the first mobile phone 10 may determine the encoding condition on the basis of screen size as well as an updated number of correspondent terminals, in step S5 or S8.

For example, in a case that the screen is divided into two parts when switching two-way communication to three-way communication, the encoding condition for the correspondent mobile phone 10 may determine that the screen size is the half of the LCD size. Also, in a case that the screen is divided into four parts when switching three-way communication to four-way communication, the encoding condition for the correspondent mobile phone 10 may determine that the screen size is a quarter of the LCD size.

Figure 5:
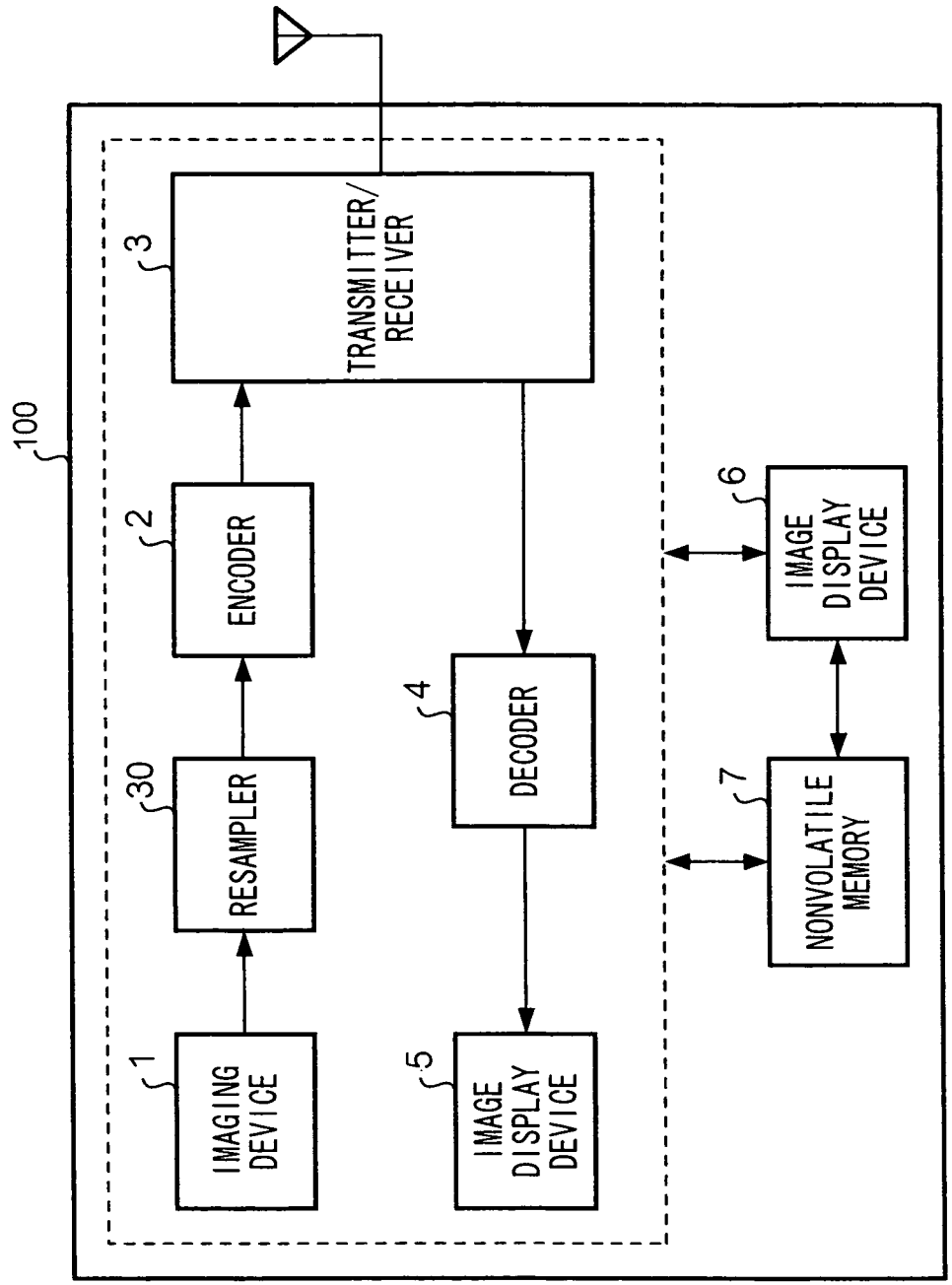

However, for changing the screen size, or changing the frame rate, it is necessary for the image data transmitted from imaging device 1 to encoder 2 to be changed to conform with the screen size or the frame rate defined by the encoding condition. Therefore, as shown in FIG. 5, mobile phone 10 may further comprise resampler 30. Resampler 30 transforms the image data outputted from imaging device 1 to image data having a different screen size or a different frame rate defined by the encoding condition. The transformed data may be provided to encoder 2. Components other than resampler 30 are the same as those of mobile phone 10 described in the above embodiments.

D-2. Second Modification

In the embodiment shown in FIG. 4, two-way communication is switched to three-way communication by transmitting a request for multi-way communication from third mobile phone 10, but it may be switched by transmitting the request from first mobile phone 10 to third mobile phone 10.

D-3. Third Modification

The motion picture receiving device and motion picture transmitting device in accordance with the present embodiment is not restricted to a mobile phone, but may be a video phone device, a personal computer, or a personal data assistant (PDA). Additionally, the image data received by the motion picture receiving device is not restricted to call data from a terminal such as a video phone. For example, the motion picture receiving device may receive the image data from a plurality of motion picture servers. Also, the motion picture transmitting device may transmit the image data to a plurality of motion picture receiving devices, the image data being pre-stored. Additionally, a display device for displaying the received image data may be separated from the motion picture receiving device, and the motion picture receiving device may transmit the received image data to the display device.

D-4. Fourth Modification

The call data including motion picture is communicated via a certain terminal (condition determination terminal) in the first and the second embodiment, and is communicated directly between terminals in the third embodiment. The two communication methods may be combined. Namely, when six way communication is carried out by combining the three-way communication of A-B-C in accordance with the second embodiment and the three-way communication of D-E-F in accordance with the third embodiment, communication between A-B-C may be carried out via mobile phone 10B, and communication between D-E-F may be carried directly between the terminals.

The invention claimed is:

1. A motion picture receiving device, comprising:
   an image data receiving unit configured to receive encoded image data;
   a decoding unit configured to decode the image data received by the image data receiving unit;
   an output unit configured to output the image data decoded by the decoding unit; and
   a control unit configured to determine an encoding condition of image data by communication with a motion picture transmitting device which is a source of the image data, and the control unit further configured to control the decoding unit to enable decoding of the image data encoded in accordance with the encoding condition;
   wherein, when a number of motion picture transmitting devices changes, the control unit is configured to determine the encoding condition based on the changed number of the motion picture transmitting devices and a decoding capacity of the decoding unit.

2. A motion picture receiving device, comprising:
   an image data receiving unit configured to receive encoded image data;
   a decoding unit configured to decode the image data received by the image data receiving unit;
   an output unit configured to output the image data decoded by the decoding unit; and
   a control unit configured to determine an encoding condition of image data by communication with a motion picture transmitting device which is a source of the image data, and the control unit further configured to control the decoding unit to enable decoding of the image data encoded in accordance with the encoding condition;
   wherein, when a number of motion picture transmitting devices changes, the control unit is configured to determine the encoding condition based on the changed number of the motion picture transmitting devices; and
      wherein the control unit further configured to determine the encoding condition of image data by communication with one or a plurality of motion picture transmitting devices which transmit the image data, based on a decoding capacity available for each of the one or a plurality of motion picture transmitting devices or a number of the motion picture transmitting devices, after the encoding condition is updated in response to an increased number of the one or a plurality of motion picture transmitting devices.

3. A motion picture receiving device, comprising:
   an image data receiving unit configured to receive encoded image data;
   a decoding unit configured to decode the image data received by the image data receiving unit;
   an output unit configured to output the image data decoded by the decoding unit;
   a control unit configured to determine an encoding condition of image data by communication with a motion picture transmitting device which is a source of the image data, and the control unit further configured to control the decoding unit to enable decoding of the image data encoded in accordance with the encoding condition;
   wherein, when a number of motion picture transmitting devices changes, the control unit is configured to determine the encoding condition based on the changed number of the motion picture transmitting devices;
   a resource information receiving unit configured to receive resource information from each of the motion picture transmitting devices, the resource information being information to determine the encoding condition at each of the motion picture transmitting devices; and a storage unit configured to store the resource information received by the resource information receiving unit;
   wherein the control unit is further configured to determine the encoding condition based on the resource information stored in the storage unit.

4. A motion picture receiving device according to claim 3, further comprising:
   a determining unit configured to determine whether the motion picture receiving device itself is an encoding condition determination device based on the resource information stored in the storage unit, the encoding condition determination device being a device configured to determine the encoding condition of image data transmitted from the motion picture transmitting device;
   wherein the control unit is further configured to determine the encoding condition based on the resource information stored in the storage unit in response to the motion picture receiving device itself being the encoding condition determination device.

5. A motion picture receiving device according to claim 3, further comprising:
   a priority calculating unit configured to calculate a priority of the motion picture receiving device based on the resource information stored in the storage unit;
   wherein the control unit is further configured to determine the encoding condition based on the priority calculated by the calculating unit and the resource information stored in the storage unit.

* * * * *